United States Patent
Nomura et al.

(10) Patent No.: US 7,026,625 B2
(45) Date of Patent: Apr. 11, 2006

(54) RADIATION DETECTION APPARATUS AND SYSTEM

(75) Inventors: Keiichi Nomura, Saitama (JP); Masakazu Morishita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/245,825

(22) Filed: Oct. 7, 2005

(65) Prior Publication Data

US 2006/0033033 A1 Feb. 16, 2006

Related U.S. Application Data

(62) Division of application No. 10/376,603, filed on Mar. 3, 2003, now Pat. No. 6,953,934.

(30) Foreign Application Priority Data

Mar. 6, 2002 (JP) .............................. 2002/060570

(51) Int. Cl.
*G01T 1/24* (2006.01)

(52) U.S. Cl. ............................ 250/370.11; 250/370.09; 250/370.01

(58) Field of Classification Search .......... 250/370.11, 250/370.09, 370.08, 370.01; 257/428; 438/57
See application file for complete search history.

(56) References Cited

U.S. PATENT DOCUMENTS

| | | | |
|---|---|---|---|
| 5,648,660 A | 7/1997 | Lee et al. | 250/370.09 |
| 5,856,699 A | 1/1999 | Hayashi et al. | 257/433 |
| 5,869,837 A | 2/1999 | Huang | 250/370.09 |
| 6,020,590 A | 2/2000 | Aggas et al. | 250/370.09 |
| 6,169,286 B1 | 1/2001 | Singh | 250/370.08 |
| 6,310,372 B1 | 10/2001 | Katayama et al. | 257/291 |
| 6,352,875 B1 | 3/2002 | Hayashi et al. | 438/67 |
| 6,489,619 B1 | 12/2002 | Street | 250/370.09 |
| 6,797,961 B1 | 9/2004 | Choo et al. | 250/370.09 |
| 6,825,473 B1 | 11/2004 | Watanabe | 250/370.09 |
| 6,953,934 B1 * | 10/2005 | Nomura et al. | 250/370.11 |
| 2002/0056810 A1 | 5/2002 | Kobayashi et al. | 250/370.09 |
| 2004/0065840 A1 * | 4/2004 | Morishita | 250/370.11 |

FOREIGN PATENT DOCUMENTS

JP 11-447645 2/1999

\* cited by examiner

*Primary Examiner*—Albert Gagliardi
(74) *Attorney, Agent, or Firm*—Fitzpatrick, Cella, Harper & Scinto

(57) ABSTRACT

The invention is to provide a radiation detection apparatus adapted for taking a moving image. The radiation detection apparatus has a pixel including a phosphor for converting radiation into light, a photoelectric conversion unit for converting the light converted in the phosphor into an electrical signal, a thin film transistor (TFT 1) for transferring the electrical signal converted in the photoelectric conversion unit, a capacitance for accumulating the electrical signal transferred by the thin film transistor (TFT 1), and a thin film transistor (TFT 2) for reading the electrical signal accumulated in the capacitance. The photoelectric conversion unit, the thin film transistor (TFT 1), the capacitance and the thin film transistor (TFT 2) are formed by a same layer configuration, and is each formed at least by a lower electrode or a gate electrode, a gate insulation film and a semiconductor layer and separated by a protective layer from the phosphor.

7 Claims, 12 Drawing Sheets

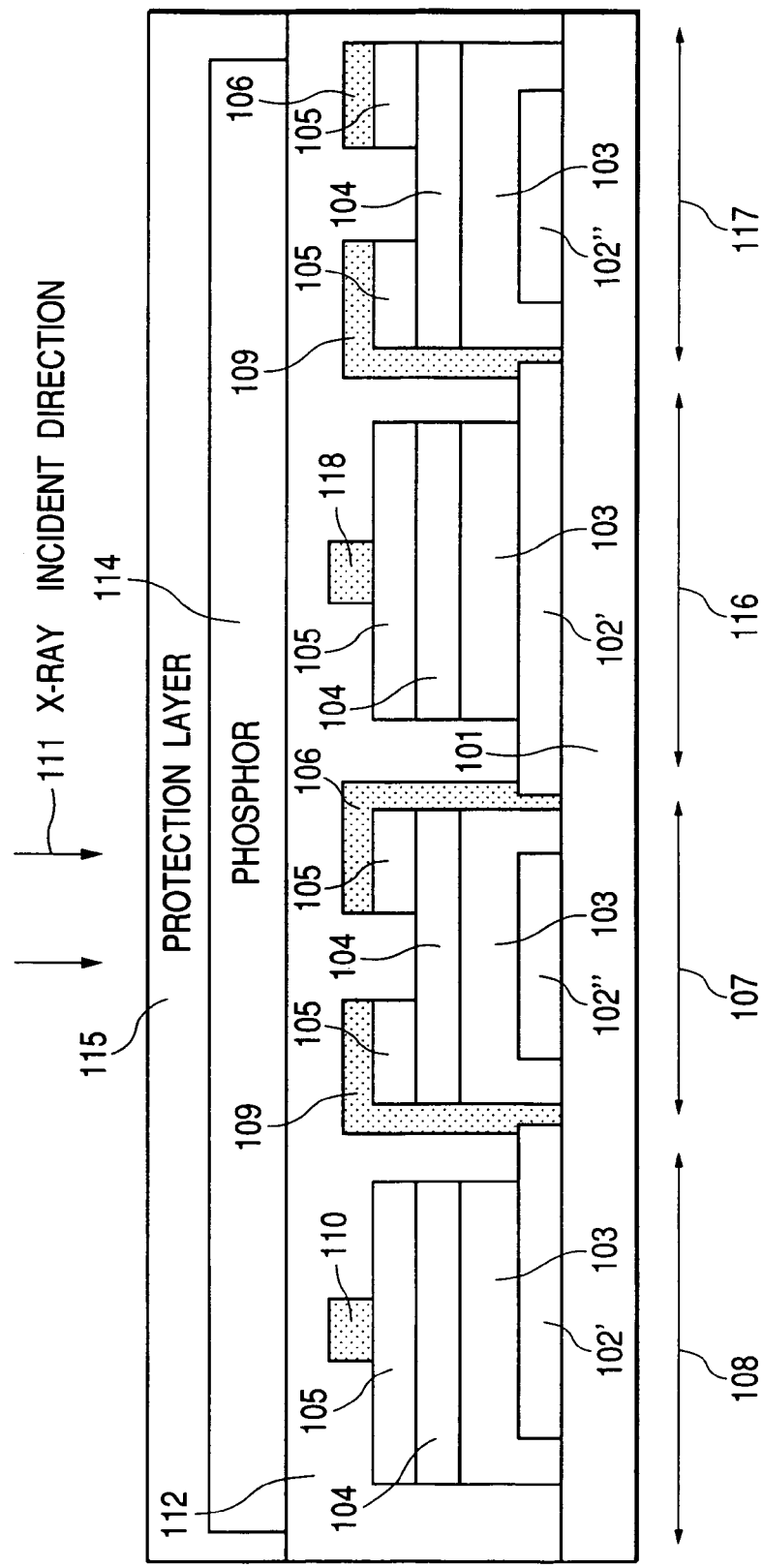

RADIATION DETECTION APPARATUS AND SYSTEM

This application is a division of application Ser. No. 10/376,603, filed Mar. 3, 2003, now U.S. Pat. No. 6,953,934 B2.

BACKGROUND OF THE INVENTION

1. Field of the Invention

The present invention relates to a radiation detection apparatus and a system, particularly to a radiation detection apparatus and a system used for X-ray detection apparatus in medical and industrial non-destructive inspection use.

In the present specification, description will be made on an understanding that radiation includes also electromagnetic waves such as X-ray, α-ray, β-ray and γ-ray.

2. Related Background Art

FIG. 10 is a schematic plan view of a pixel of a radiation detection apparatus known in the related art, FIG. 11 is a cross-sectional view along a line 11—11 in FIG. 10, and FIG. 12 is an equivalent circuit diagram of the apparatus shown in FIGS. 10 and 11.

In the following, there will be given a brief explanation on the function of the radiation detection apparatus known in the related art. In such radiation detection apparatus, a phosphor (114) formed under a protective layer (115) converts a radiation into a light, and a photoelectric conversion unit (108) provided on a glass substrate (101) converts such light into a charge, which is accumulated in a capacitance C1 constituted by the photoelectric conversion unit (108).

A TFT unit 1 (107) is activated to output the charge, accumulated in the capacitance C1, through a signal line (113) to an external unrepresented signal processing unit.

The TFT unit 1 (107) and the photoelectric conversion unit (108) are formed on the glass substrate (101) at the same time.

In the following, there will be given an explanation on a method for producing the radiation detection apparatus shown in FIGS. 10 to 12.

At first, a gate metal film composed for example of Al or Cr is formed by sputtering or evaporation method, and is then patterned and etched by a photolithographic process to form a gate wiring portion (102), a lower electrode (102') of the photoelectric conversion unit (108) and a gate electrode (102") of the TFT unit 1 (107). The etching process is executed by both wet etching and dry etching.

Then a gate insulation film (103) constituted by SiN, $SiO_2$ etc. is deposited by plasma CVD method (chemical vapor deposition) utilizing silane, ammonia, hydrogen, TEOS etc. as the source materials.

Then a semiconductor layer (104) with amorphous silicon (a-Si:H), polysilicon etc. is deposited in succession by plasma CVD method with silane and hydrogen as the source materials. In this process, the semiconductor layer (104) has to be formed thick (for example 400 to 1000 nm) in order to convert therein the light into a sufficient electrical signal.

Then an ohmic contact layer (105) is deposited in succession by plasma CVD method. As the ohmic contact layer (105), there is employed amorphous silicon or microcrystalline silicon (μc-Si) formed with silane and hydrogen as the source material gases, and phosphine gas($PH_3$) etc. is used as a doping gas during the film deposition.

Then an isolation process is executed by patterning and etching in a photolithographic process thereby forming the photoelectric conversion unit (108) and a thin film transistor unit (107).

Then a film of a wiring metal of Al, Cr etc. is formed by sputtering method, and an etching is executed to form a source electrode (109), a drain electrode (106), a signal line (113), and a driving wiring (bias wiring) (110). The signal line (113) is connected to the drain electrode (106).

There are further formed thereon a protective layer (112) of SiN, PI etc. for stabilizing the device characteristics, and a phosphor of a material (114) such as GOS, CsI etc. for converting X-ray into light. The X-ray enters from a direction indicated by an arrow (111), and is converted by the phosphor (114) into a visible light, which is subjected to a photoelectric conversion in the semiconductor layer (104) of the photoelectric conversion unit (108). On the phosphor (114), there is formed a protective layer (115) such as of PET.

Also a radiation detection apparatus for directly converting X-ray into a charge is disclosed for example in Japanese Patent Application Laid-Open No. 11-44764.

However, such known art still has a room for improvement for taking a moving image, and is associated with a drawback of taking much time to transfer and reset signals. Especially at higher frame rate, charge readout cannot be executed due to the short detection time.

Therefore, an object of the present invention is to provide a radiation detection apparatus suitable for capturing a moving image.

SUMMARY OF THE INVENTION

The above-mentioned object can be attained, according to the present invention, by a radiation detection apparatus including a conversion element for converting a radiation into an electrical signal, the apparatus including a plurality of pixels each including a first thin film transistor for transferring an electrical signal converted by the conversion element, a capacitance for accumulating the electrical signal transferred by the first thin film transistor, and a second thin film transistor for reading the electrical signal accumulated in the capacitance, wherein the conversion element is formed by a photoelectric conversion element for converting the radiation into visible light and detecting the visible light.

There may also be provided a third thin film transistor for resetting the electrical signal accumulated in the capacitance.

There may also be adopted a configuration in which gates of the first thin film transistors are connected in common to a same row and connected in common over plural columns.

According to another embodiment of the present invention, there is also provided a driving method for a radiation detection apparatus, including steps of converting an irradiating radiation into a signal charge by a conversion element, transferring the signal charge into an accumulating capacitance by a signal pulse through a wiring connected in common to all the pixels, reading the signals accumulated in the accumulating capacitances in succession for each row to output an image of a frame, and repeating the aforementioned operations thereby displaying a moving image.

Details of the present invention and embodiments thereof will be explained in the following.

BRIEF DESCRIPTION OF THE DRAWINGS

FIG. 4 is a cross-sectional view along a line 4—4 in FIG. 3;

DETAILED DESCRIPTION OF THE PREFERRED EMBODIMENTS

In the following, embodiments of the present invention will be explained with reference to the accompanying drawings.

First Embodiment

Figure 1:
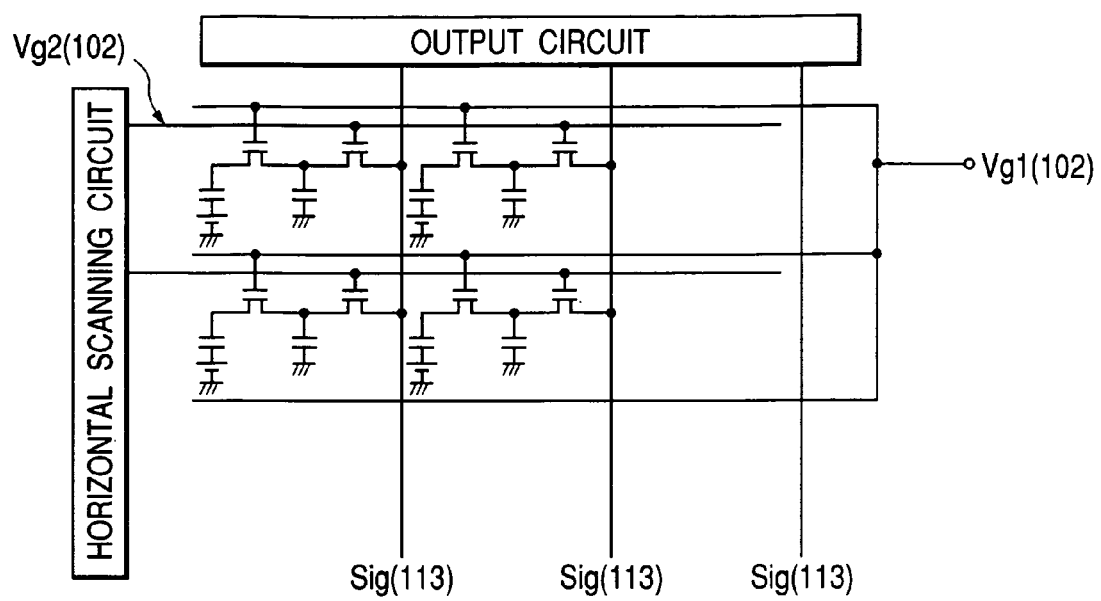
FIG. 1 is a schematic equivalent circuit diagram of a part of a radiation detection apparatus constituting a first embodiment of the present invention.
Figure 2:
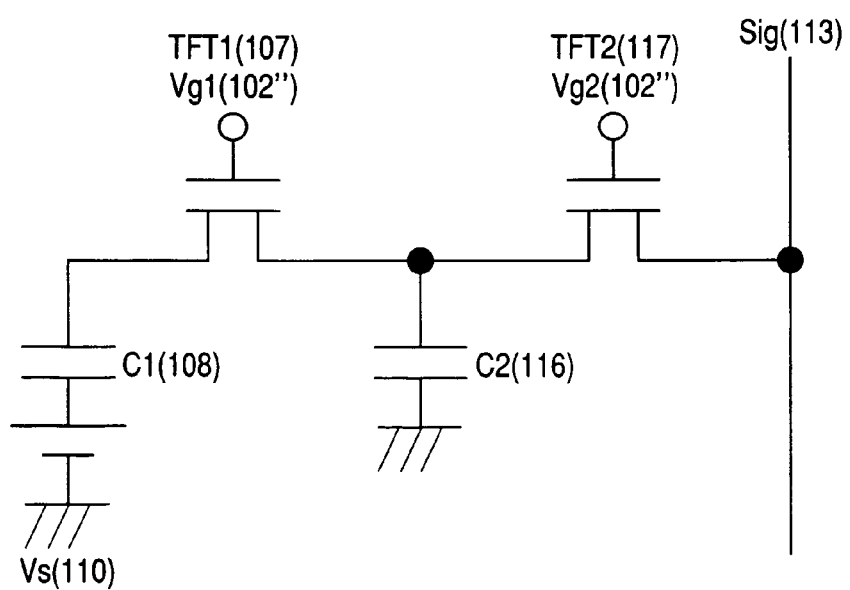
FIG. 2 is a magnified view of a pixel shown in FIG. 1.
Figure 3:
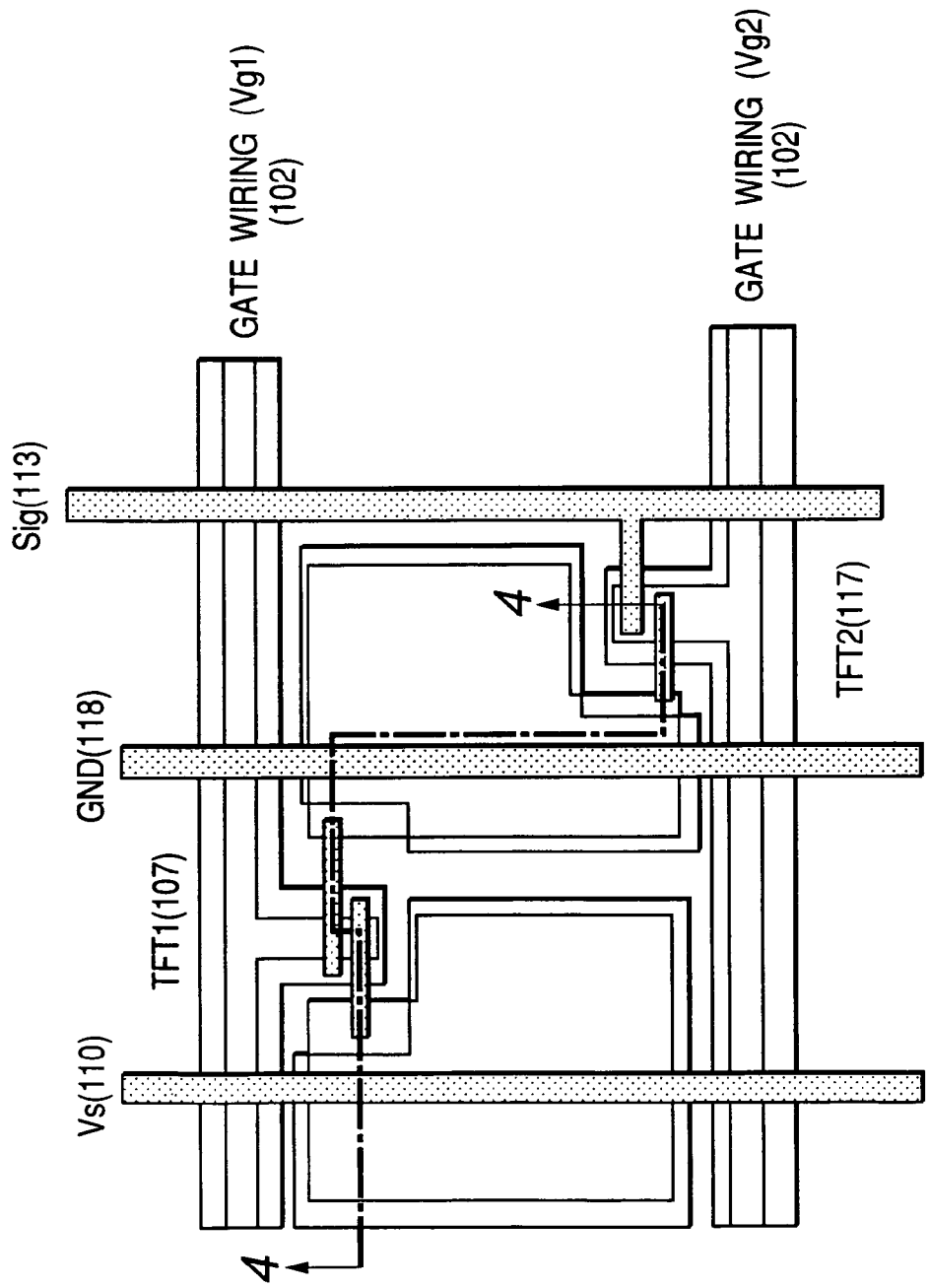
FIG. 3 is a schematic plan view of a pixel of the radiation detection apparatus.

FIG. 1 is a schematic equivalent circuit diagram of a part of a radiation detection apparatus constituting a first embodiment of the present invention. FIG. 2 is a magnified view of a pixel shown in FIG. 1. FIG. 3 is a schematic plan view of a pixel of the radiation detection apparatus. FIG. 4 is a cross-sectional view along a line 4—4 in FIG. 3.

In the following, there will be briefly explained an operation of an indirect type radiation detection apparatus of the present embodiment. In the radiation detection apparatus of the present embodiment, a phosphor (114) formed under a protective layer (115) converts a radiation into a light, and a photoelectric conversion unit (108) provided on a glass substrate (101) converts the light into a charge which is accumulated in a capacitance C1 formed by the photoelectric conversion unit (108).

By driving a TFT unit 1 (107), the charge accumulated in the capacitance C1 is transferred to a capacitance C2 (116) and accumulated therein. Then, by driving a TFT unit 2 (117) connected to a horizontal scanning circuit, the charge is read through a signal line (113) to an output circuit and transferred to an external unrepresented signal processing unit.

The TFT unit 1 (107), the photoelectric conversion unit (108), the capacitance C2 (116) and the TFT unit 2 (117) can be formed simultaneously in an inverted staggered configuration on the glass substrate (101).

In the following, there will be explained a production method of the radiation detection apparatus shown in FIGS. 1 to 4, together with the function thereof.

At first, on the glass substrate (101), a gate metal film such as of Al, Cr etc. is formed by sputtering or evaporation method, and is patterned and etched by a photolithographic process to form lower electrodes (102') of a gate wiring (102), the photoelectric conversion unit (108) and the capacitance C2 (116), and gate electrode (102") of the TFT unit 1 (107) and that of the TFT unit 2 (117). The etching process may be executed by both wet etching and dry etching.

Then a gate insulation film (103) such as of SiN, $SiO_2$ etc. is formed by plasma CVD method (chemical vapor deposition) employed silane, ammonia, hydrogen, TEOS etc. as the source material gases.

Then a semiconductor layer (104) with amorphous silicon (a-Si:H) or polysilicon, is formed in succession by plasma CVD method with silane and hydrogen as the source material gases. In this process, the semiconductor layer (104) is deposited thick, for example, with a thickness from 400 to 1000 nm in order to convert the light into a sufficient electrical signal in the semiconductor layer (104).

Then an ohmic contact layer (105) is deposited in succession by plasma CVD method. Amorphous silicon or microcrystalline silicon (μc-Si) is employed as the ohmic contact layer, formed with silane and hydrogen as the source material gases and introduced phosphine ($PH_3$) etc. as a doping gas during the film formation. In the accompanying drawings, layers from 103 to 105 are represented as three-layered CVD film.

Then an isolation process is executed by patterning and etching in a photolithographic process to form the photoelectric conversion unit (108), the TFT unit 1 (107), the capacitance (C2) and the TFT unit 2 (117).

Then a film of a wiring metal of Al, Cr etc. is formed by sputtering method and is etched to form a source electrode (109), a drain electrode (106), a signal line (113), a GND line (118) and a driving wiring (110). The signal line (113) is connected to the drain electrode (106) of the TFT unit 2 (117).

Further, on these components, there are formed a protective layer (112) of SiN, PI etc. for stabilizing the device characteristics, and a phosphor (114) such as of GOS or CsI is formed on the protective layer (112) in order to convert X-ray into light. The incident X-ray enters from an arrow (111) direction in FIG. 4 and is converted into a visible light by the phosphor (114), and thus the visible light is converted into charges in the semiconductor layer (104) of the photoelectric conversion unit (108). On the phosphor (114), there is formed a protective layer (115) such as of PET.

In the configuration of forming another capacitance in each pixel and a gate line of a transfer transistor which transfers charges from the sensor to the another capacitance in common with all the pixels, it is possible to read charges in the capacitance C2 which was converted one time before in the photo electronic conversion unit(108) during the photoelectric conversion.

Such the configuration is therefore advantageous for taking moving images, particularly in case the sensor itself requires a resetting (refreshing) operation.

In the configuration of the present invention, the carriers generated in photoelectric conversion unit can be accumulated in the another capacitances simultaneously for all the pixels, the sensors can be reaccumulated soon after the carriers transfer to the another capacitances. This can be easily achieved to connect all the gate lines of the signal transferring TFT units 1 (107).

Such the configuration enables, for example, refreshing operation of C2 capacitance and signal line in each line.

Such the operation is particularly advantage of a high-speed readout such as taking moving images.

Furthermore, it is possible to take enough time to accumulate charges in the sensor capacitance C1. TFTs with amorphous silicon (a-Si:H) or polysilicon have higher on resistance (Ron) and parasitic capacitance (Cf) is easily exceed 50 pF in the X-ray sensor of large area substrate, then RC time constant (Ron×Cf) becomes long and longer transfer time is necessary to transfer charges. For example in case of Ron ($100k\Omega$ to $10M\Omega$) and Cf (50 pF to 100 pF), RC time constant is very long, compared with ICs made from crystal Si, and it takes much time to transfer and reset charges. In this case, with the configuration of the present invention, it is possible to take moving pictures with enough irradiation time.

Also an accumulation unit (116) for accumulating the charge converted in the photoelectric conversion unit (108) and a switch TFT (117) for reading the charge accumulated in the accumulation unit (116) can be formed by the same layer, whereby the production process can be simplified.

More specifically, a moving image can be obtained by convertingirradiated radiation into signal charge by the converting element, transferring the signal charge to the accumulating capacitance by applying a signal pulse to a gate wiring connected in common with all the pixels, reading the signal charge accumulated in the accumulating capacitance in succession for each row thereby outputting an image of a frame, and repeating these operations thereby displaying a moving image. With such the driving method, the configuration of the present embodiment in which gate line of the TFT units 1 (107) is formed in common with all the pixels, is preferable to achieve smooth signal transfer.

Second Embodiment

Figure 5A:
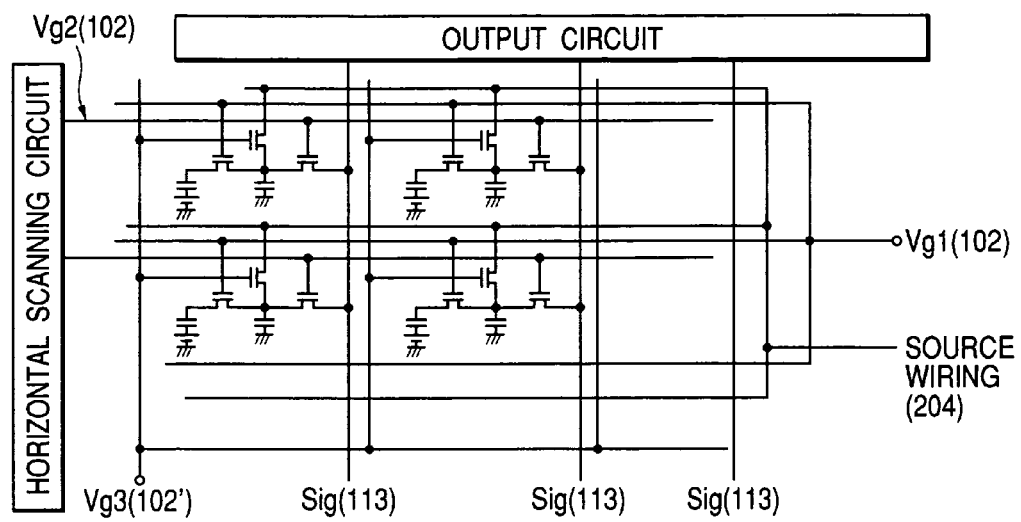
FIGS. 5A and 5B are schematic equivalent circuit diagrams of a part of a radiation detection apparatus constituting a second embodiment of the present invention.
Figure 5B:
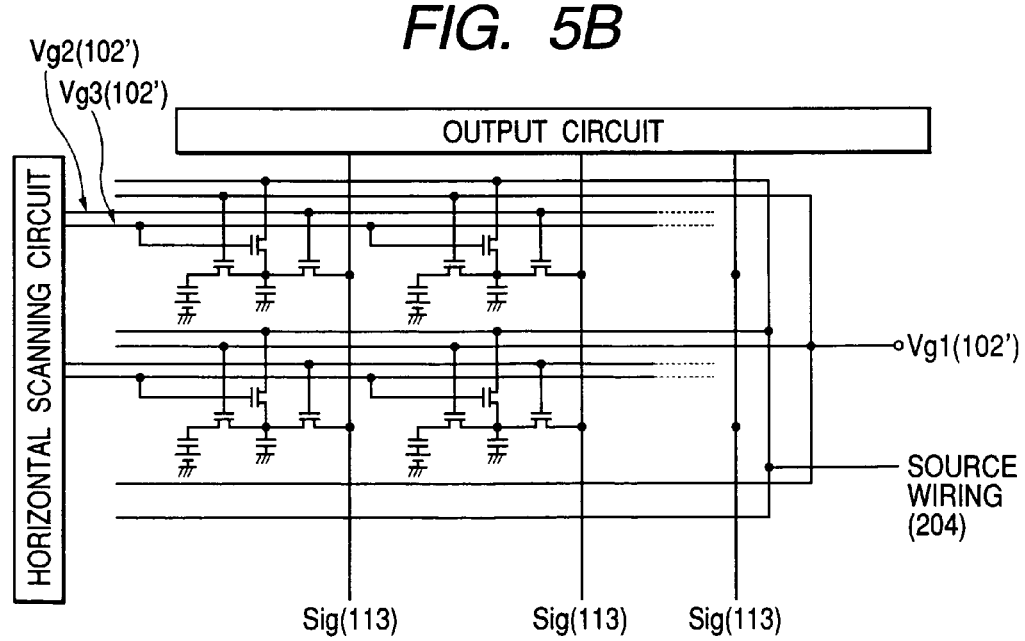
Figure 6:
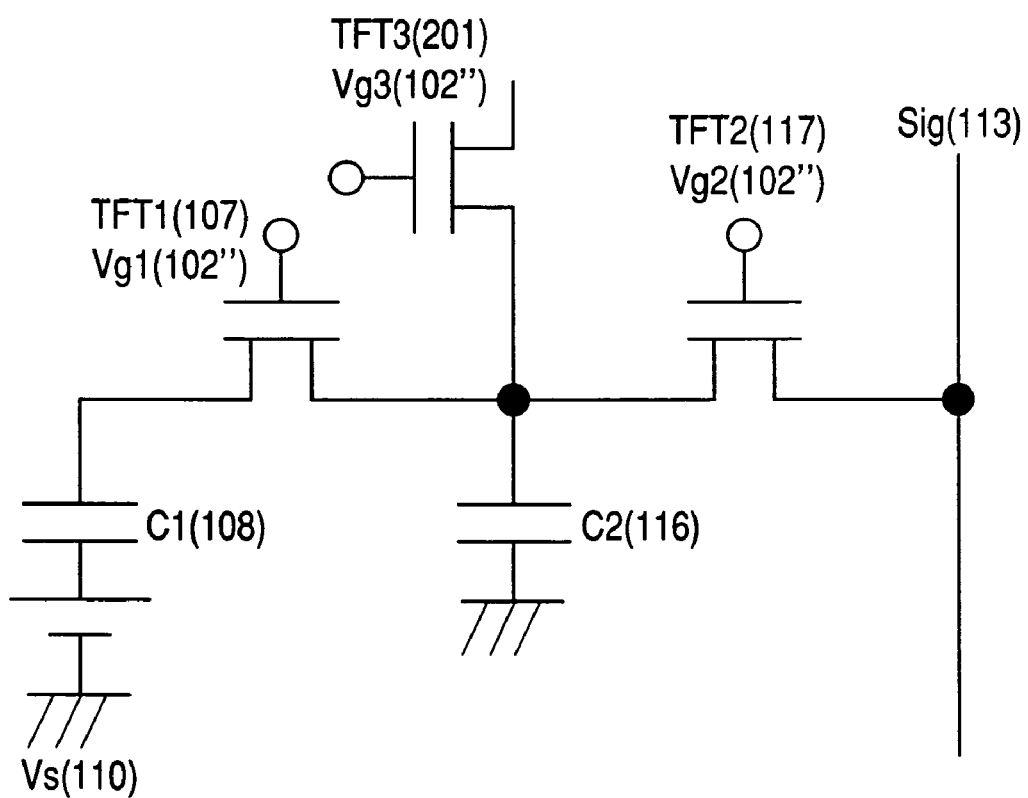
FIG. 6 is a magnified view of a pixel shown in FIGS. 5A and 5B.
Figure 7:
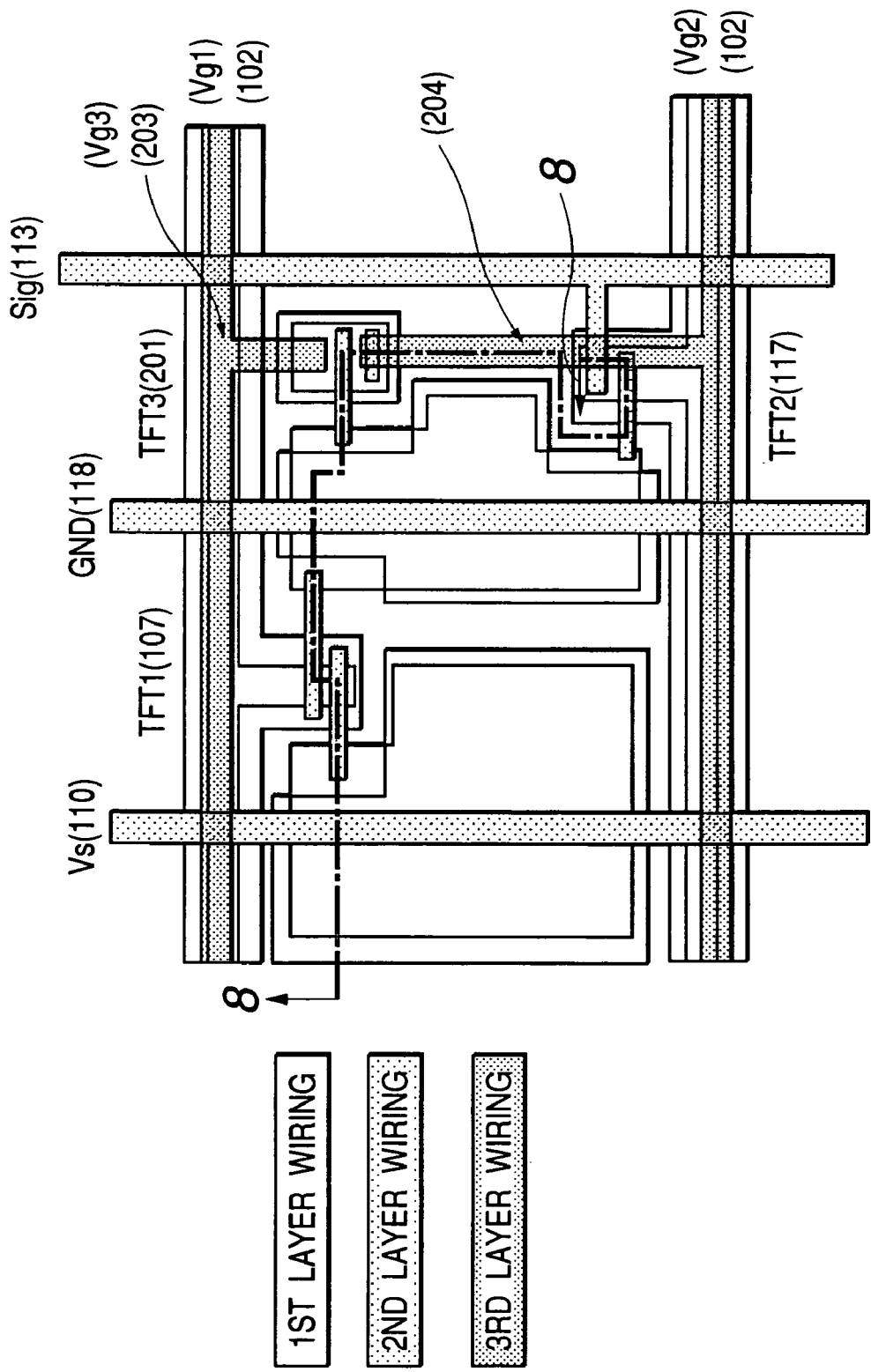
FIG. 7 is a schematic plan view of a pixel of the radiation detection apparatus.
Figure 8:
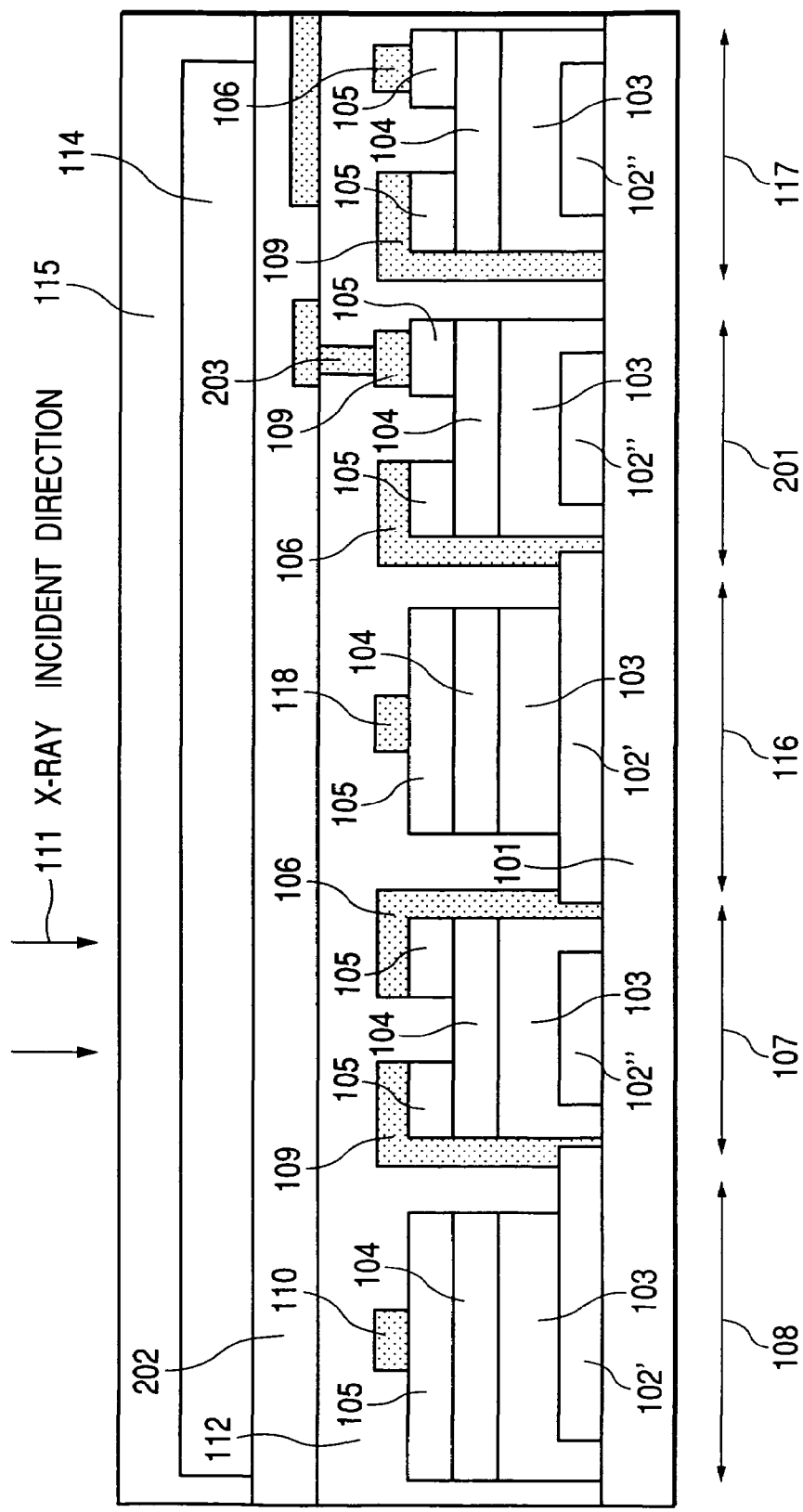
FIG. 8 is a cross-sectional view along a line 8—8 in FIG. 7.

FIGS. 5A and 5B are schematic equivalent circuit diagrams of a part of a radiation detection apparatus constituting a second embodiment of the present invention. FIG. 6 is a magnified view of a pixel shown in FIGS. 5A and 5B. FIG. 7 is a schematic plan view of a pixel of the radiation detection apparatus. FIG. 8 is a cross-sectional view along a line 8—8 in FIG. 7. In FIGS. 5A to 8, components equivalent to those shown in FIGS. 1 to 4 are represented by corresponding symbols.

In the following, there will be briefly explained an operation of an indirect type radiation detection apparatus of the present embodiment. In the radiation detection apparatus of the present embodiment, a phosphor (114) formed under a protective layer (115) converts a radiation into a light, and a photoelectric conversion unit (108) provided on a glass substrate (101) converts the light into a charge which is accumulated in a capacitance C1 formed by the photoelectric conversion unit (108).

By driving a TFT unit 1 (107), the charge accumulated in the capacitance C1 is transferred to a capacitance C2 (116) and accumulated therein. Then, by driving a TFT unit 2 (117) connected to a horizontal scanning circuit, the charge is read through a signal line (113) to an output circuit and transferred to an external unrepresented signal processing unit.

After reading the charge, the capacitance C2 (116) is reset to a predetermined potential by activating a TFT unit 3 (201).

Also the TFT unit 3 (201), like the photoelectric conversion unit (108), is simultaneously formed on the glass substrate (101) in an inverse staggered configuration.

In the following, there will be explained a production method for the radiation detection apparatus shown in FIGS. 5 to 8, together with the function thereof.

At first, on the glass substrate (101), a gate metal film such as of Al, Cr etc. is formed by sputtering or evaporation method, and is patterned and etched by a photolithographic process to form lower electrodes (102') of a gate wiring (102), the photoelectric conversion unit (108) and the capacitance C2 (116), and gate electrode (102") of the TFT unit 1 (107), that of the TFT unit 2 (117) and that of the TFT unit 3 (201). The etching process may be executed by both wet etching and dry etching.

Then a gate insulation film (103), a semiconductor layer (104) an ohmic contact layer (105) are formed in a procedure similar to that in the first embodiment.

Then an isolation process is executed by patterning and etching in a photolithographic process to form the photoelectric conversion unit (108), the TFT unit 1 (1.07), the capacitance C2 (116), the TFT unit 2 (117) and the TFT unit 3 (201).

Then a source electrode (109), a drain electrode (106), a signal line (113), a GND line (118) and a driving wiring (110) are formed in a process similar to that in the first embodiment.

Further, on these components, there is formed a protective layer (112) of SiN, PI etc. for stabilizing the device characteristics, and a contact hole (203) is formed by dry etching.

The contact hole (203) is formed above the gate electrode (102") and the source electrode (109) of the TFT unit 3 (201). Then a metal layer such as of Al, Cr etc. for a third metal layer wiring is formed and is etched to form a source wiring (204) of the TFT unit 3 (201).

Then a protective layer (202) of SiN, PI etc. is formed, and a phosphor (114) and a protective layer (115) are formed same as the first embodiment.

Such the configuration enables not only to take moving images but also to reduce fluctuation in the outputs of the each pixel.

Also the present embodiment in FIG. 5B employs a configuration in which the gate electrodes of the resetting TFT units 3 (201) are connected and resetting in each line.

Also the present embodiment in FIG. 5A employs a configuration in which all the gate electrodes of the resetting TFT units 3 (201) are conneced. Such the configuration is preferable that the capacitances of all the pixels can be reset when readout operation has done.

Also the present embodiment is featured by a fact that the gate wiring (203) of a third layer is not positioned on the signal line (113) in a second layer. It is made orthogonal to the signal line (113) of the second layer, whereby it is possible to reduce a parasite capacitance between the gate wiring (203) of the third layer and the signal line (113) of the second layer, thereby noises in the signal line are reduced and the S/N ratio is improved.

The foregoing embodiments have been explained with a radiation detection apparatus of so-called indirect type, but the present invention is also applicable to a radiation detection apparatus of direct type. In particular, as mentioned above, it is preferable to connect all the gate wirings of the TFT unit 1(107) and those of TFT unit 3(201) to reset the capacitance because of the fact that the readout speed can be improved. Also in case of obtaining a moving image, it is also possible to obtain an image of a higher image quality by resetting the accumulating capacitance after repeating the operation explained in the first embodiment by a predetermined number of times. Such predetermined number of times means that the resetting may be executed every time, and can be suitably selected according to FPS (frames per second).

Also, instead of the MIS type sensor in the present embodiment, there may be employed for example a PIN type sensor.

Third Embodiment

Figure 13:
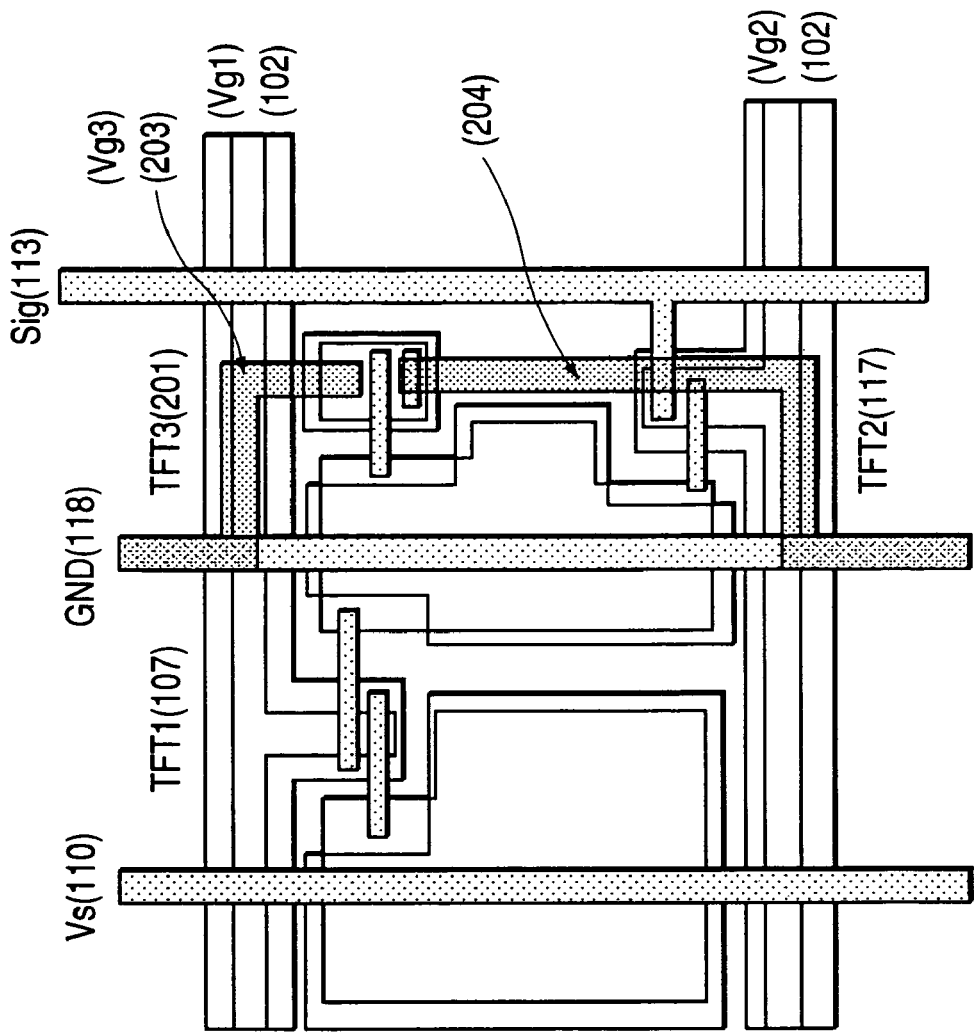
FIG. 13 is a schematic plan view of a pixel of a radiation detection apparatus constituting a third embodiment of the present invention.

FIG. 13 is a schematic plan view of a pixel of a radiation detection apparatus constituting a third embodiment of the present invention. A wiring pattern of the third layer in the present embodiment is different from that of the second embodiment.

The wiring of the third layer is not formed on the photoelectric conversion unit (108) in order to avoid a loss of the incident light, nor formed on the signal line (113) in order to avoid an increase in the parasitic capacitance.

FIG. 13 shows an example that it is formed on the GND line. Such the configuration eliminates the parasitic capacitance between the signal line(113) of the second layer wiring and third layer wiring at crossing points, as compared with the second embodiment, thereby noises in the signal line are reduced and the S/N ratio is improved. Such the layout of wirings is particularly advantageous in case a pixel has plural transistors regardless of the functions (such as transfer, resetting etc.) thereof.

Fourth Embodiment

Figure 14:
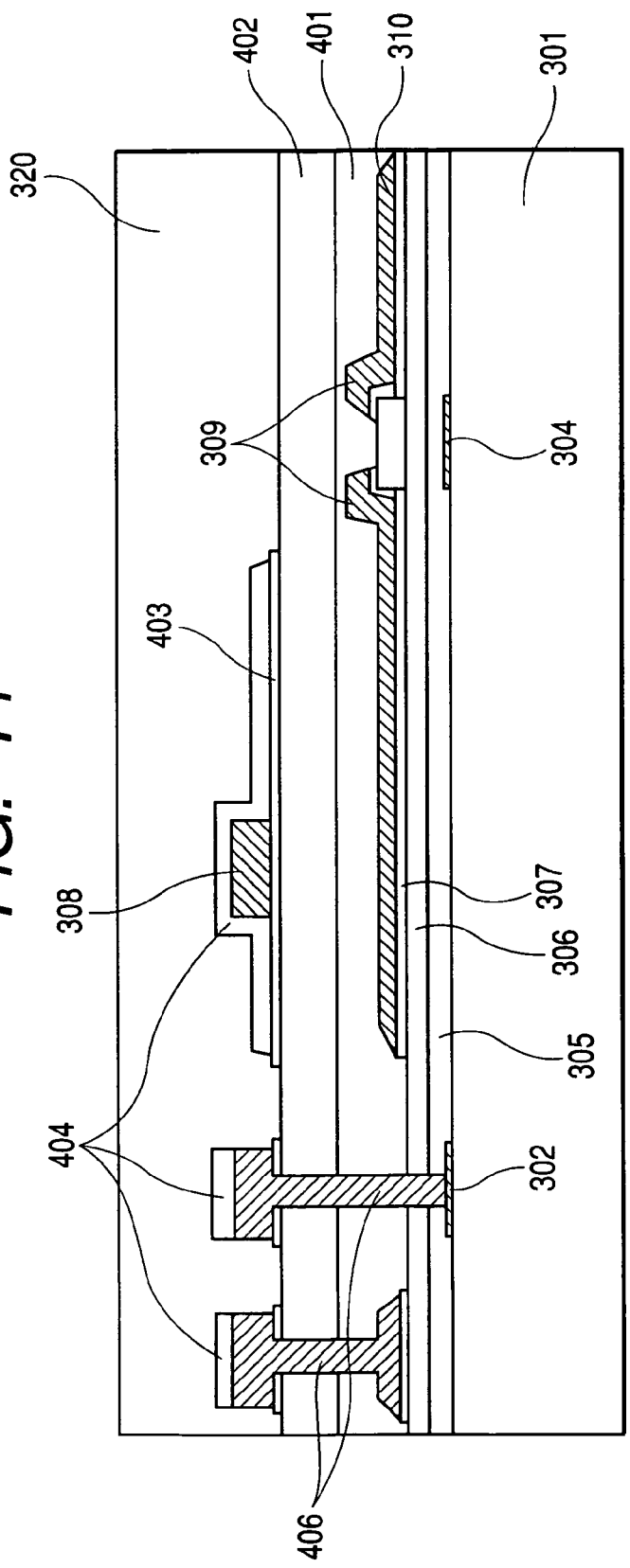
FIG. 14 is a sectional view of a fourth embodiment of the present invention.

The present embodiment is shown in a sectional view in FIG. 14 has a configuration in which a photoelectric conversion layer (sensor element) is superposed on a TFT substrate. The drawing shows only one TFT for the purpose of brevity, but some transistors may be additionally provided as explained in the first to third embodiments. There are shown a glass substrate 301, a TFT drive wiring 302, a switch TFT gate electrode 304, a first gate insulation film 305, a first intrinsic a-Si film 306, a first ohmic contact layer 307, a bias wiring 308, a transfer TFT SD (source-drain) electrode 309, a signal line 310, a protective film 320, a second gate insulating film 401, a second intrinsic a-Si film 402, a second ohmic contact layer 403, a transparent electrode layer 404, and contact holes 406.

In the following, there will be explained an example of a production method for a flat panel detector of the present embodiment.

In a first step, on the glass substrate, a switching TFT drive wiring 302 and a switching TFT gate electrode 304 are formed with a first metal layer. The first metal layer is formed with Cr, Al, Mo, Ti, Al—Nd alloy or a laminated structure thereof by sputtering method.

In a second step, a first gate insulation film 305, a first intrinsic a-Si film 306 and an insulation film for channel stopper (etch stopper) are laminated in succession by plasma CVD method.

In a third step, the insulation film for channel stopper is etched by an exposure from the rear side.

In a fourth step, an ohmic contact layer (n+ layer) 307 is laminated by plasma CVD method.

In a fifth step, a second metal layer is laminated. The second metal layer is formed with Cr, Al, Mo, Ti, Al—Nd alloy or a laminated structure thereof by sputtering.

In a sixth step, a resist process is executed to form source and drain electrodes 309 of the switching TFT, a signal line 310 and a lower electrode of the aforementioned radiation signal converting element.

In a seventh step, a second gate insulation film 401, a second intrinsic a-Si film 402 and a second ohmic contact layer 403 (N+ layer) are laminated in succession by plasma CVD method.

In an eighth step, a contact hole (connection hole) 406 is formed.

In a ninth step, a third metal layer is laminated. The third metal layer is formed with Cr, Al, Mo, Ti, Al—Nd alloy or a laminated structure thereof by sputtering.

In a tenth step, a resist process is executed to form a bias wiring 308 of the photoelectric conversion element.

In an eleventh step, a transparent electrode layer 404 is laminated. The transparent electrode layer is formed for example with ITO (indium tin oxide), ZnO, tin oxide ($SnO_2$), etc.

In a twelfth step, the transparent electrode layer and the second ohmic contact layer are etched.

Thereafter, a protective layer 320 is formed and a phosphor is adhered for example with an organic resin. Through the foregoing steps, the flat panel display of the present invention is produced.

The accumulating capacitance may be prepared by a process same as that for the TFTs, or may utilize a capacitance between the gate electrode and the source electrode of the TFT.

Such the configuration, having little restriction resulting from the relationship with the sensor element, improves the design freedom of the TFTs and also increases the aperture rate of the sensor element.

Fifth Embodiment

Figure 9:
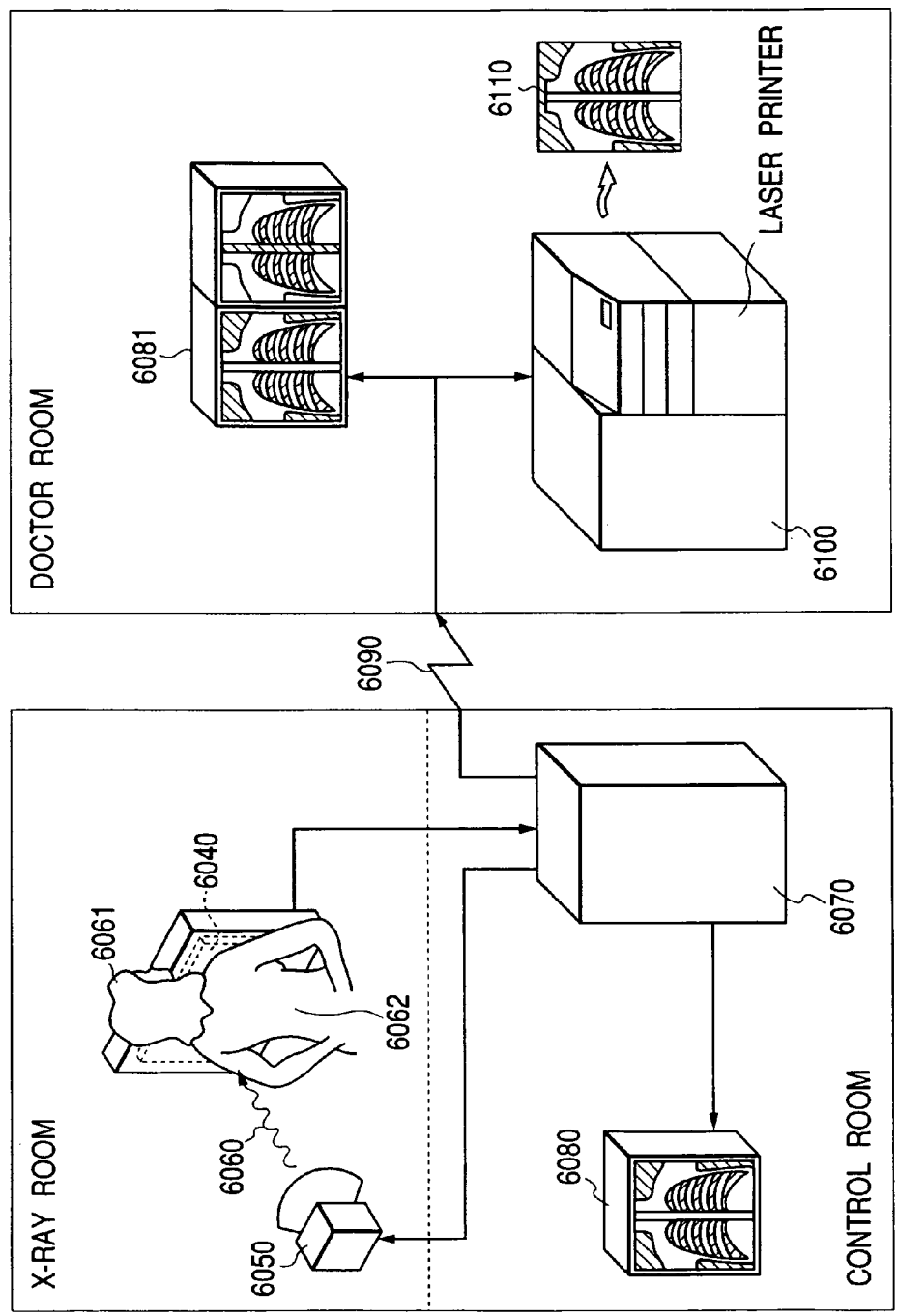
FIG. 9 is a schematic view showing the configuration of an X-ray detection system constituting a fifth embodiment of the present invention.
Figure 10:
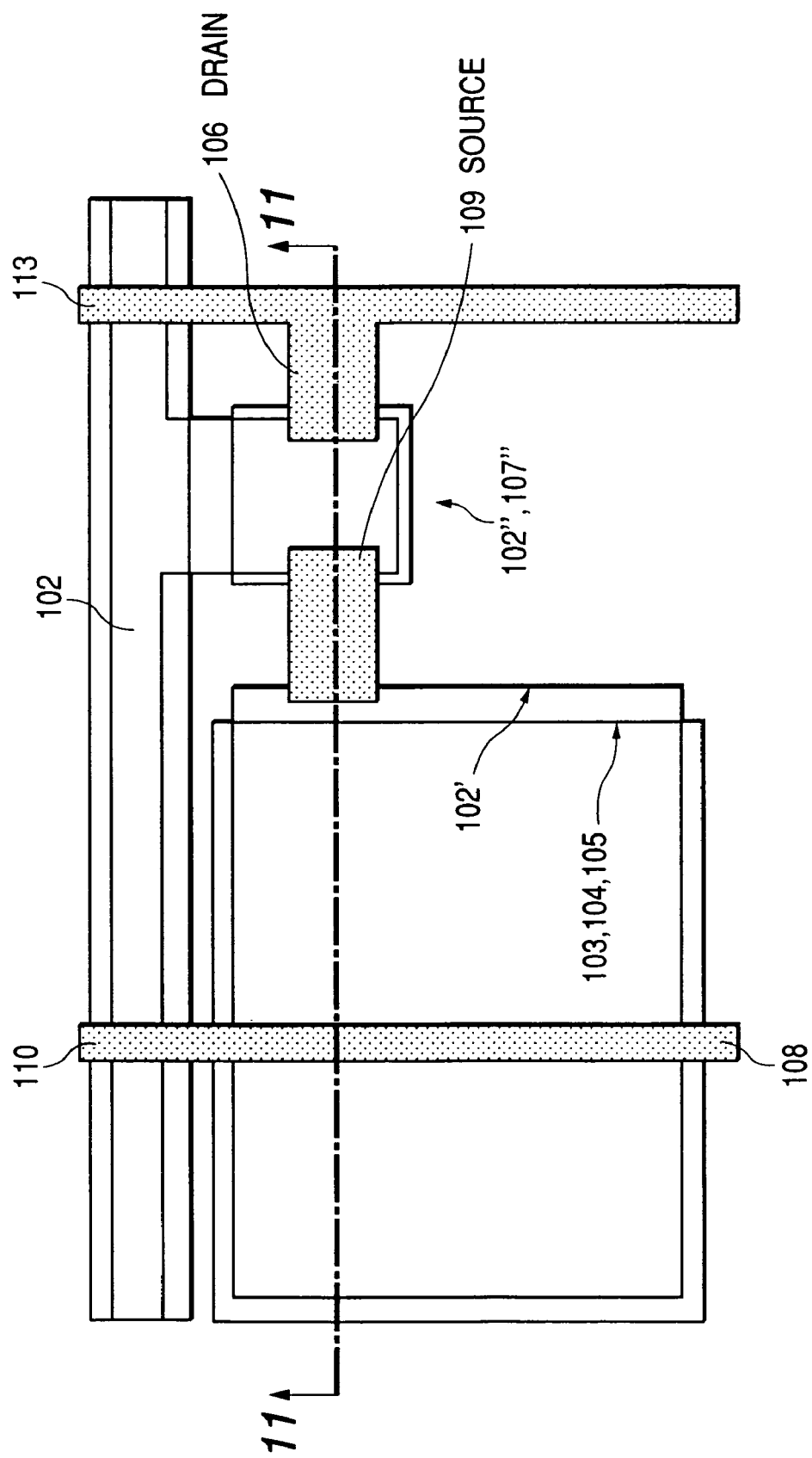
FIG. 10 is a schematic plan view of a pixel of a prior radiation detection apparatus.
Figure 11:
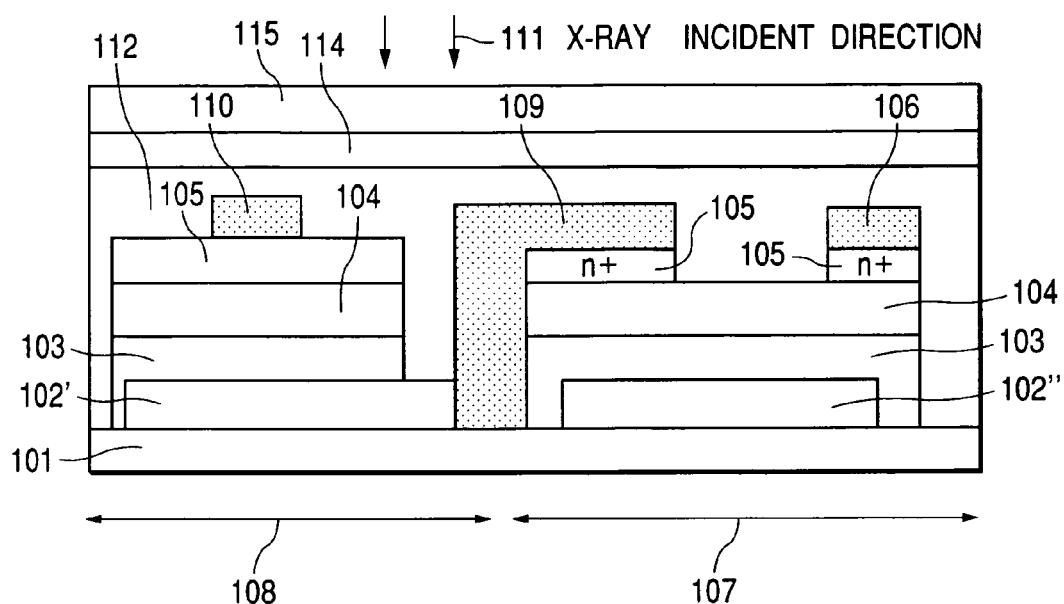
FIG. 11 is a cross-sectional view along a line 11—11 in FIG. 10.
Figure 12:
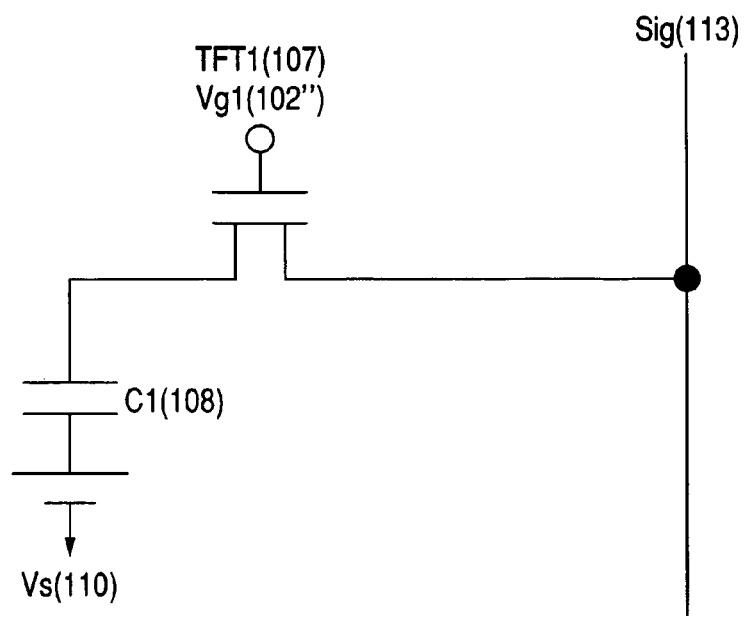
FIG. 12 is an equivalent circuit diagram of the apparatus shown in FIGS. 10 and 11.

FIG. 9 is a schematic view showing the configuration of an X-ray detection system constituting a fifth embodiment of the present invention.

An X-ray 6060 emitted by an X-ray bulb 6050 is transmitted by a chest portion of a patient or a test subject 6061 and enters an image sensor 6040 constituting a radiation detection apparatus. The incident X-ray includes information on the interior of the body of the patient 6061. In response to the entry of the X-ray, the phosphor emits a light, which is photoelectrically converted to obtain electrical information. The information is converted into a digital signal, then processed by an image processor 6070 and can be observed on a display 6080 in a control room.

Such information can also be transferred to a remote location by transmission means such as a telephone line 6090, for display on a display 6081 in a doctor room of another location or for storage in storage means such as an optical disk, thereby enabling diagnosis by a doctor in a remote location. Also recording on a film 6110 is possible by a film processor 6100.

What is claimed is:

1. A radiation detection apparatus comprising:
   a plurality of pixels each including, on a substrate, a conversion element for converting a radiation into an electrical signal, a first thin film transistor for transferring an electrical signal converted by the conversion element, a capacitance for accumulating the electrical signal transferred by the first thin film transistor, and a second thin film transistor for reading the electrical signal accumulated in the capacitance,
   wherein the capacitance and the first or second thin film transistor are formed in the same layer on the substrate.

2. The apparatus according to claim 1, wherein
   a part of the conversion element is laminated on a part of the first or second thin film transistor.

3. The apparatus according to claim 2, wherein the part of the conversion element is laminated on a part of the capacitance.

4. The apparatus according to claim 1, wherein
the conversion element is formed by a phosphor for converting the radiation into a visible light, and by a photoelectric conversion unit for converting the visible light into an electric carrier.

5. The apparatus according to claim 4, wherein the photoelectric conversion unit has an MIS structure.

6. A method of driving a radiation detection apparatus according to claim 1, comprising steps of:
using the conversion element to convert the radiation into an electric signal charge;
transferring the electric signal charge to the capacitance by a signal pulse through a wiring commonly connected to all pixels;
reading successively the signal accumulated in the capacitance per each row, to perform an operation of outputting an image of one frame; and
performing the operation repeatedly, to display a moving image.

7. A radiation detection system comprising:
a radiation detection apparatus according to claim 1;
a radiation source; and
a display apparatus for displaying an output image.

* * * * *

UNITED STATES PATENT AND TRADEMARK OFFICE
CERTIFICATE OF CORRECTION

| | | |
|---|---|---|
| PATENT NO. | : 7,026,625 B2 | |
| APPLICATION NO. | : 11/245825 | |
| DATED | : April 11, 2006 | |
| INVENTOR(S) | : Keiichi Nomura et al. | |

It is certified that error appears in the above-identified patent and that said Letters Patent is hereby corrected as shown below:

ON THE TITLE PAGE ITEM [57] ABSTRACT:

Line 14, "is each" should read --each is--.

COLUMN 2:

Line 19, "a" should be deleted.

COLUMN 4:

Line 12, "employed" should read --employing--;
Line 56, "the" should be deleted;
Line 61, "another" should read --other--;
Line 63, "another" should read --other--; and
Line 66, "the" should be deleted.

COLUMN 5:

Line 1, "the" should be deleted and
"advantage of" should read --advantageous for--;
Line 6, "is" should be deleted;
Line 7, "exceed" should read --exceeds-- and "then" should read --so that--;
Line 22, "convertingirradiated" should read --converting irradiated--; and
Line 29, "the" should be deleted.

COLUMN 6:

Line 18, "unit 1 (1.07)," should read --unit 1 (107),--;
Line 36, "the" should be deleted;
Line 37, "the" (second occurrence) should be deleted;
Line 44, "Such the configuration" should read --In such configuration it--; and
Line 46, "when" should read --when the-- and "has done" should read --is completed--.

UNITED STATES PATENT AND TRADEMARK OFFICE
CERTIFICATE OF CORRECTION

PATENT NO. : 7,026,625 B2
APPLICATION NO. : 11/245825
DATED : April 11, 2006
INVENTOR(S) : Keiichi Nomura et al.

It is certified that error appears in the above-identified patent and that said Letters Patent is hereby corrected as shown below:

COLUMN 7:

Line 19, "the" (first occurrence) should be deleted;
Line 23, "the" (second occurrence) should be deleted; and
Line 31, "has" should read --and has--.

COLUMN 8:

Line 26, "the" should be deleted.

Signed and Sealed this

Seventeenth Day of October, 2006

JON W. DUDAS
*Director of the United States Patent and Trademark Office*